UNITED STATES PATENT OFFICE 2,344,265

METHOD OF HYDROLYSIS

Walter W. Plechner, Metuchen, and Joseph M. Jarmus, East Orange, N. J., assignors to National Lead Company, New York, N. Y., a corporation of New Jersey No Drawing. Application December 24, 1940, Serial No. 371,588

5 Claims. (Cl. 23—202)

The present invention relates to the manufacture of pigments especially titanium dioxide pigments and has particular reference to the hydrolysis step in the process of manufacturing said pigments.

Among the objects of the present invention is the production of a pigment-forming hydrous titanium oxide having improved filtering and washing characteristics, as a consequence of which it is possible to produce titanium dioxide pigments more efficiently and economically. Other objects and advantages will become apparent as the description of the invention proceeds.

The usual process for manufacturing titanium dioxide pigments is now well known. Broadly speaking, it comprises: reacting a titaniferous ore with concentrated sulfuric acid to produce a water-soluble porous mass of iron and titanium sulfates; dissolving this porous mass in water or weak sulfuric acid, reducing the iron content of said solution from the ferric to the ferrous state and clarifying the solution of water-insoluble impurities; crystallizing out of the solution by chilling a portion of the ferrous sulfate; concentrating the solution to the desired titanium content, and thermally hydrolyzing the titanium sulfate solution to precipitate hydrous titanium oxide which is separated from the mother liquor, filtered, washed and calcined.

We have now unexpectedly found a method of hydrolysis whereby the precipitated hydrous titanium oxide is rendered more easily filterable and washable without in any way impairing, and indeed, in some instances improving the pigmentary properties of the ensuing titanium dioxide pigment.

Our novel method is adaptable to commonly used hydrolysis processes employing titanium sulfate solutions and also is particularly useful in such processes where, for the purpose of improving the pigmentary properties of the calcined precipitate, antimony is introduced at precipitation instead of at calcination.

According to the practice of our invention, a portion only of the sulfate solution is subjected to an incomplete thermal hydrolysis, whereupon the remaining portion of the total sulfate solution is added, and the whole then thermally brought to a substantially complete hydrolysis of the titanium values.

In one preferred procedure of our invention a portion equal to about 10 per cent of an ilmenite solution of a composition of about

|  | G. p. l. |
|---|---|
| $TiO_2$ (1–2 g. p. l. in the trivalent form) | 250 |
| $FeSO_4$ | 180 |
| $H_2SO_4$ | 500 | is set aside, the other main portion, equal to about 90 per cent is heated to 90°–100° C. and then added in about 15 minutes under constant agitation to a volume of water or dilute acid heated to 90°–100° C. and equal to about 20 per cent of the total volume of solution-water mixture. The solution-water mixture is then brought to a boil, boiled for about one-half hour to about two hours while the stirring is continued, during which time the major part of the titanium values in solution was precipitated. At this point the smaller portion of solution which was set aside at the beginning of the hydrolysis is added and the whole boiled for about three to four hours under constant agitation at which time the hydrolysis is brought to completion.

It was found that the deliquoring and washing rates of the precipitate obtained by this novel procedure were substantially improved over those obtained when the total amount of solution was at once subjected to hydrolysis. It was also found that the pigment properties of the finished titanium dioxide pigment were in no way impaired.

We have further found that our method is convenient when, for the purpose of improving the pigmentary properties of the final product, antimony is introduced into the precipitate via the sulfate solution from which it is precipitated together with the titanium values. It was found that if antimony trioxide equal to about .2% to about 5%, but preferably about 1%, calculated on the total $TiO_2$ in solution, was dissolved therein prior to the hydrolysis that the final precipitate could be deliquored and washed only with the greatest of difficulty. When, however, the antimony trioxide was dissolved in the smaller portion of sulfate solution, which according to our invention was set aside for later addition to the hydrolysis, then the deliquoring and washing rates were greatly improved, in fact were superior to the filtering and washing rate of precipitates obtained when no antimony was present in solution.

When the hydrolysis is carried out in the above manner according to the practice of our invention, the yields obtainable of precipitated hydrous titanium oxide are excellent, being about 96.5 per cent of the titanium values in solution. Moreover, our novel method of hydrolysis makes it possible to obtain hydrous titanium oxide precipitates having greatly improved filtering and washing characteristics as compared with prior art precipitates. This fact is clearly shown from the figures hereinafter set forth wherein the filtering and washing rates of hydrous titanium oxide hydrolyzed according to the present invention are compared with the filtering and washing rates of an equal quantity of hydrous titanium oxide precipitated by usual prior art hydrolysis methods.

Before proceeding further it is desirable for the sake of clarity to describe the technique which was employed in determining the "deliquoring rate" and the "washing rate" of the precipitates obtained by the usual hydrolysis method as well as by the method of our novel process.

The "deliquoring rate" is the time expressed in minutes and fractions thereof which is required for 500 cc. of the final precipitation at 85° C. to be deliquored, i. e., sucked dry under a vacuum of about 28" on a 19 cm. Buchner funnel using two wetted No. 5, 18.5 cm. Whatman filter papers without permitting the filter cake to crack.

The "washing rate" is the time expressed in minutes or fractions thereof required for 500 cc. of water at room temperature to pass through the deliquored precipitate obtained above.

The total washing time, i. e., the time required to wash the precipitate "free" of iron is recorded in some cases.

Although we already have described our invention in sufficient detail to enable those skilled in the art to work our novel process we shall now proceed to illustrate by the aid of actual examples the advantages embodied in the present invention.

which is dissolved antimony trioxide, $Sb_2O_3$, in an amount equal to one per cent calculated on the $TiO_2$ of the total solution.

A. In one liter of stock ilmenite solution (see Example 1) of 250 g. p. l. $TiO_2$ were dissolved 2.5 grams of $Sb_2O_3$. The precipitation procedure was otherwise the same as that described under Example 1.

The deliquoring and washing rates of the final precipitate were such as to be incapable of economical filtration.

B. When the 2.5 grams of antimony trioxide were dissolved in 100 cc. of the solution, i. e., 10 per cent, instead of in the entire one liter as under (A) above, and was added to the hydrolysis of the other 900 cc. solution at a later stage, according to our novel method, but otherwise carrying out the experiment according to the procedure of Example 1–B, the rate of deliquoring was increased about three times over 2–A, and was even superior to the rate of deliquoring and washing obtained in Example 1–B where no antimony was present.

The following table clearly and succinctly illustrates the improved results of the present invention.

Table 1

| Example No. | Precipitation data | Antimony addition | Deliquoring rate | Washing | |
|---|---|---|---|---|---|
| | | | | Rate | Time |
| 1-A | Regular precipitation | None | 8' 12" | 13' 47" | 39' 25" |
| 1-B | 10% of solution added at an advanced stage of hydrolysis | do | 4' 4" | 11' 35" | 33' 0" |
| 2-A | $Sb_2O_3$ dissolved in full volume of ilmenite solution | 1.0% on total $TiO_2$ | 10' 30" | 33' 10" | 70' 0" |
| 2-B | 10% of solution, in which was dissolved the $Sb_2O_3$, added at an advanced stage of hydrolysis | 1.0% on total $TiO_2$ in 10% of solution | 3' 57" | 7' 36" | 18' 15" |

Example 1

This experiment represents a regular method of hydrolysis of the prior art and serves as a standard for comparison.

A. One liter of an ilmenite solution of the composition

| | G. p. l. |
|---|---|
| $TiO_2$ (1–2 g. p. l. in the trivalent form) | 250 |
| $FeSO_4$ | 180 |
| $H_2SO_4$ | 500 | heated to 96° C. was added uniformly to 250 cc. of water of 91° C. over a period of 16 minutes while stirring under reflux condenser. The temperature, which was about 101° C. at the end of the addition, was then gradually raised to the boiling point during the next 44 minutes and kept at boiling for about six hours. In order to maintain the concentration of the free acid at a more or less constant value during the hydrolysis nearly boiling water was periodically added to the precipitation.

At the end of a total boiling time of about six (6) hours, 500 cc. of the finished precipitation were deliquored and washed according to the technique already described whereby the rate of deliquoring and rate of washing were determined.

B. When this experiment was repeated using 90 per cent of the solution, and then adding to the hydrolysis the remaining 10 per cent according to the present invention, the rates of deliquoring and washing were substantially improved.

Example 2

This experiment represents a regular method of hydrolysis of the prior art using a solution in It is evident from Table 1 that the deliquoring and washing rates of the precipitates were noticeably improved when 10 per cent of the solution, according to the practice of our invention were added to the hydrolysis at an advanced stage. The improvement in filtering and washing characteristics is particularly marked in those cases where antimony is dissolved in the solution. When antimony is present in the solution at the start of a regular precipitation the slow rate of deliquoring and washing of the precipitate becomes prohibitive for an economical operation, whereas, when the antimony is dissolved in the 10 per cent of solution and added to the hydrolysis at a later time, the filtering characteristics are enormously improved.

It should be clearly understood that our improved process is applicable to the hydrolysis of titanium sulfate solutions of a wide range of concentrations and great variations of composition in respect to the ratio of $TiO_2:FeSO_4:H_2SO_4$. Our process is equally as useful in other hydrolysis processes than that used herein for illustrative purposes.

Accordingly, we do not wish to limit our invention in any way to a solution of such concentration and composition as herein has been employed to illustrate our novel process, nor do we limit our invention to the particular process of hydrolysis which is used herein to demonstrate the advantages of the invention.

Likewise, the proportion of unhydrolyzed solution to partly hydrolyzed solution in our process is not limited to the ratio used in the example, namely, a ratio of 10:90, but we may operate the process with solution ratios of from, for example, 5:95 to 50:50. The unhydrolyzed portion of the solution may be added at any time desired to the portion under hydrolysis depending upon the type of solution used and the rate of deliquoring and rate of washing one may wish to obtain. Ordinarily, however, the amount of unhydrolyzed solution and the time at which it is added is chosen so as to obtain the best possible filtration characteristics commensurate with the preservation of the optimum pigment properties.

It will thus be seen that by our novel method of hydrolysis it is possible to manufacture titanium dioxide pigments more economically by virtue of the savings effected in time of washing and filtering and power consumption of the filtering apparatus.

It is to be understood that the present invention is applicable not only to titanium dioxide pigments, but also to its composites and other pigments which are prepared by processes involving a hydrolytic step similar to that employed in producing titanium dioxide pigments.

We claim:

1. A process for hydrolyzing a titanium salt solution which comprises dividing the said titanium salt solution into a major portion and a minor portion, hydrolyzing the said major portion, without further addition of titanium salt solution, until the titanium values of said major portion are partly precipitated, mixing the minor portion of said titanium salt solution with the partly hydrolyzed major portion and then hydrolyzing the mixture until the titanium values contained therein are substantially completely precipitated.

2. A process for hydrolyzing a titanium salt solution which comprises dividing the said titanium salt solution into a major portion and a minor portion, subjecting the said major portion of the solution to a thermal hydrolysis, without further addition of titanium salt solution, until the titanium values of said major portion are partly precipitated, mixing the minor portion of said titanium salt solution with the partly hydrolyzed major portion and then hydrolyzing the mixture until the titanium values contained therein are substantially completely precipitated.

3. A process for hydrolyzing a titanium salt solution which comprises dividing the said titanium salt solution into a major portion of about 90% of the solution and a minor portion of about 10% of the solution, subjecting the said major portion of the solution to a thermal hydrolysis, without further addition of titanium salt solution, until the titanium values of said major portion are partly precipitated, mixing the minor portion of said titanium salt solution with the partly hydrolyzed major portion and then hydrolyzing the mixture until the titanium values contained therein are substantially completely precipitated.

4. A process for hydrolyzing a titanium salt solution which comprises dividing the said titanium salt solution into a major portion and a minor portion, subjecting the said major portion of the solution to a thermal hydrolysis, without further addition of titanium salt solution, until the titanium values of said major portion are partly precipitated, dissolving a small amount of an antimony compound in the minor unhydrolyzed portion of the solution, then mixing the said minor portion with the partly hydrolyzed major portion and hydrolyzing the mixture until the titanium values contained therein are substantially completely precipitated.

5. A process for hydrolyzing a titanium salt solution which comprises dividing the said titanium salt solution into a major portion of about 90% of the solution and a minor portion of about 10% of the solution, dissolving in the said minor portion a small amount of an antimony compound, subjecting the major portion of the solution to a thermal hydrolysis, without further addition of titanium salt solution, until the titanium values of said major portion are partly precipitated, then mixing the unhydrolyzed minor portion of the titanium salt solution in which the antimony compound has been dissolved with the partly hydrolyzed major portion of the solution and hydrolyzing the mixture until the titanium values contained therein are substantially completely precipitated.

WALTER W. PLECHNER.
JOSEPH M. JARMUS.